A. LATHAM.
Plow Truck.

No. 232,515.  Patented Sept. 21, 1880.

WITNESSES.
Arthur G. Morey.
William R. Manlove.

INVENTOR.
Adolphus Latham By
G. L. Chapin.
Atty.

UNITED STATES PATENT OFFICE.

ADOLPHUS LATHAM, OF TIPPECANOETOWN, INDIANA.

PLOW-TRUCK.

SPECIFICATION forming part of Letters Patent No. 232,515, dated September 21, 1880.

Application filed February 16, 1880.

*To all whom it may concern:*

Be it known that I, ADOLPHUS LATHAM, of Tippecanoetown, in the county of Marshall and State of Indiana, have invented a new and useful Improvement in Plow-Trucks, of which the following is a specification, reference being had to the accompanying drawings, illustrating the improvement.

Figure 1:
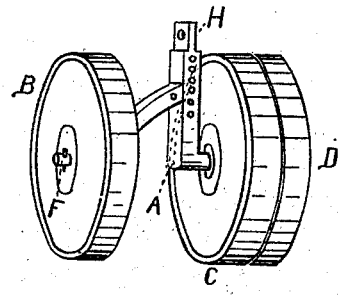
Figure 2:
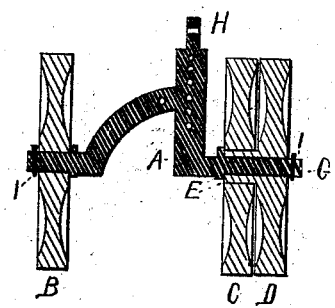

Figure 1 is a perspective representation of a plow-truck embodying my improvement; Fig. 2, a section thereof taken longitudinally through the axle-tree.

The object of the present invention is to improve the two-wheeled plow-truck which runs on the land close to the furrow and supports the plow. In these two-wheeled trucks there is a difficulty in operating them in consequence of the wheel nearest to the furrow breaking down the land and to a certain extent filling the furrow in advance of the plow, and at the same time causing the plow to incline toward the furrow and run irregularly and to do imperfect work. I remedy wholly these objections by the use of a compound wheel on the furrow side of the truck and constructing the inner half of the wheel to turn on a thimble-arm projecting out from the inside of the hub of the outer half of the wheel, whereby a broad traveling tread to the furrow-wheel is provided in such a manner that its periphery may have two independent movements, so as to prevent too great friction in turning the truck round short curves and prevent its surface from becoming loaded with sticky earth to a greater extent than the land-wheel, which is the case when one single broad-tread wheel on the furrow side of the truck is used.

A represents an axle-tree which is provided with or has formed on its top part a tenon, H, in the ordinary manner to support a plow-beam, and on it is formed a short arm, F, for the support of a landside truck-wheel, and on the opposite end is formed a long arm for the support of the part D of the compound wheel D C, and the thimble-arm E, extending outward from the inside of the hub of part D. The part C of the wheel D C is provided with a box or bearing large enough to turn on the thimble-arm E, and the arm G is of such length as to pass through both parts of the compound wheel and receive a linchpin, I, by means of which the compound wheel is held in place.

By this construction the parts D C composing the compound wheel may rotate together or separately, according as the surface of the ground shall present itself to their peripheries.

To change the trucks from right to left hand plows the plow-beam should be removed from the tenon H and have its ends reversed.

I claim and desire to secure by Letters Patent of the United States—

In a plow-truck for supporting a plow, the compound wheel D C, the wheel D running on the arm of the truck-frame, and being provided with a thimble-arm, E, on which the wheel C is placed, so that both wheels may have an independent movement or rotation, or both may rotate together, in combination with a single wheel on the opposite arm of the truck, as specified.

ADOLPHUS LATHAM.

Witnesses:
WM. GAISER,
JOHN KAY.